United States Patent
Kim et al.

(10) Patent No.: US 7,493,257 B2
(45) Date of Patent: Feb. 17, 2009

(54) METHOD AND APPARATUS HANDLING SPEECH RECOGNITION ERRORS IN SPOKEN DIALOGUE SYSTEMS

(75) Inventors: Jung-eun Kim, Suwon-si (KR); Jae-won Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 926 days.

(21) Appl. No.: 10/911,675

(22) Filed: Aug. 5, 2004

(65) Prior Publication Data

US 2005/0033574 A1 Feb. 10, 2005

(30) Foreign Application Priority Data

Aug. 6, 2003 (KR) ........................ 10-2003-0054475

(51) Int. Cl.
*G10L 15/22* (2006.01)
*G10L 15/04* (2006.01)
*G10L 15/00* (2006.01)

(52) U.S. Cl. .................... 704/240; 704/253; 704/236; 704/275; 704/231

(58) Field of Classification Search .............. 704/231, 704/234, 236–245, 251–257, 270–270.1, 704/E15.001–E15.038, 275
See application file for complete search history.

(56) References Cited

U.S. PATENT DOCUMENTS

| | | | | |
|---|---|---|---|---|
| 5,357,596 A | * | 10/1994 | Takebayashi et al. | 704/275 |
| 6,006,183 A | * | 12/1999 | Lai et al. | 704/235 |
| 6,567,778 B1 | | 5/2003 | Chao Chang et al. | |
| 2003/0040907 A1 | * | 2/2003 | Chang et al. | 704/231 |
| 2003/0083876 A1 | * | 5/2003 | Lin | 704/251 |
| 2003/0105634 A1 | * | 6/2003 | Abella et al. | 704/257 |
| 2003/0233230 A1 | * | 12/2003 | Ammicht et al. | 704/235 |

FOREIGN PATENT DOCUMENTS

| | | |
|---|---|---|
| KR | 10-0350002 | 4/1996 |
| KR | 10-1999-015122 | 3/1999 |
| KR | 2001-86902 | 9/2001 |

OTHER PUBLICATIONS

"Chapter 1: On the Means for Clarification in Dialogue", DRAFT Oct. 31, 2002, 12:35 pm, Matthew Purver and Jonathan Ginzburg, *Dept. of Computer Science*, King's College, London UK, Patrick Healey, *Dept. of Computer Science*, University of London, UK.

* cited by examiner

*Primary Examiner*—Talivaldis Ivars Smits
*Assistant Examiner*—David Kovacek
(74) *Attorney, Agent, or Firm*—Staas & Halsey LLP

(57) ABSTRACT

To handle portions of a recognized sentence having an error, a user is questioned about contents associated with portions. According to a user's answer, a result is obtained. Speech recognition unit extracts a speech feature of a speech signal inputted from user and finds a phoneme nearest to the speech feature to recognize a word. Recognition error determination unit finds a sentence confidence based on a confidence of the recognized word, performs examination of a semantic structure of a recognized sentence, and determines whether or not an error exists in the recognized sentence which is subjected to speech recognition according to predetermined criterion based on both sentence confidence and result of examining semantic structure. Meta-dialogue generation unit generates a question asking user for additional information based on content of a portion where the error exists and a type of the error.

33 Claims, 14 Drawing Sheets

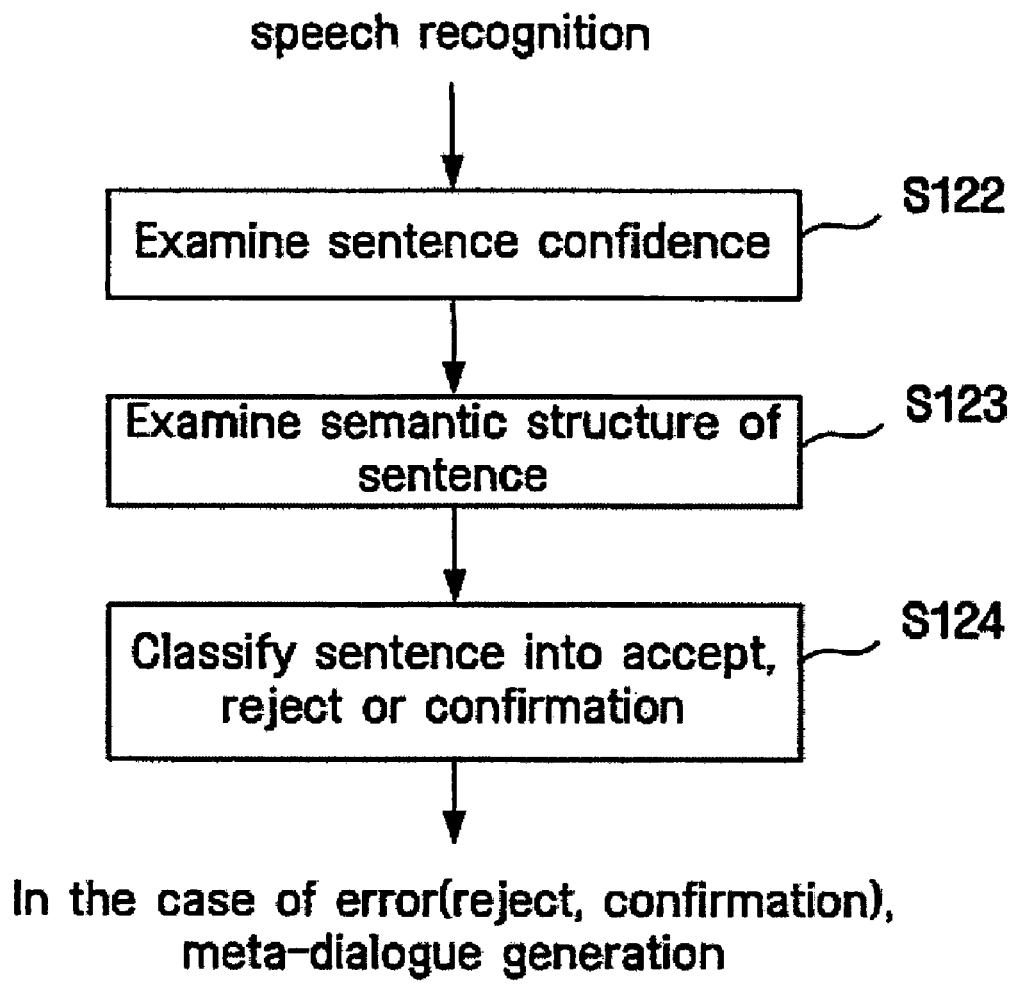

FIG. 5

| Type | Example |
|---|---|
| 510 — Non-reprise clarifications | "What did you say?" |
| 520 — Reprise sentences<br>–literal<br>–wh-substituted | "You phoned the mommy?"<br>"Elder brother went where?" |
| 530 — Reprise sluices | "Who?" |
| 540 — Reprise fragments<br>–literal<br>–wh-substituted | "The move you saw yesterday?"<br>"Which movie?" |
| 550 — Gaps | A: "Tomorrow three o' clock please reserve The Sum of All Fears."<br>B: "The Sum ···??" |
| 560 — Gap fillers | A: "I want the movie Steven Spielberg directed, Saving···."<br>B: "Saving Private Ryan?" |
| Conventional | "Pardon?" |

FIG. 7B
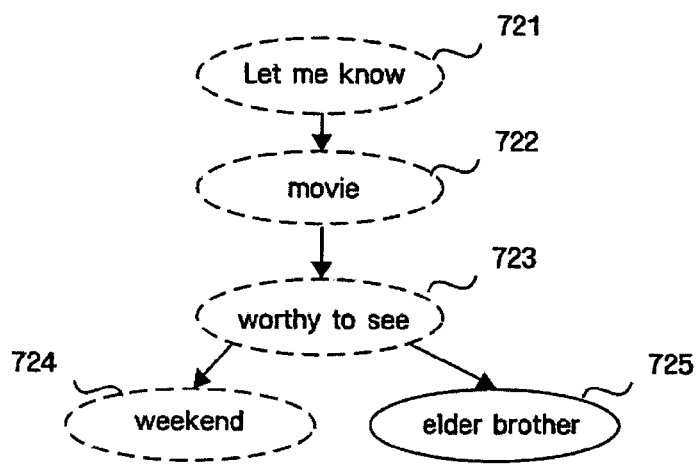
S: A movie worthy for the elder brother to see?
☐ : Explicit confirmation   ◯ : Implicit confirmation   ⬭ : Omission S: What comes tomorrow?

Reprise sentences (wh-substituted)

□ : Explicit confirmation   ○ : Implicit confirmation   ⬭ : Omission

S : There is an examination from one o' clock?

Reprise sentences (literal)

☐ : Explicit confirmation    ○ : Implicit confirmation    ◌ : Omission

FIG. 7E
751  752  753  754  755
(There is)  (examination)  (for two hours)  from one o' clcok  today
S : There is an examination for two hours what?
Gap fillers
□ : Explicit confirmation    : Implicit confirmation    : Omission

FIG. 9A

User : please reserve *Ben-Hur* at Saturday. (The system recognizes the word of "*Ben-Hur*" to be "*Bad Home*")

System : Reserve what?

User : *Ben-Hur*. (The system mistakes the word of "*Ben-Hur*" for a word of "*Batter*")

System : I cannot understand. Please make response to which film you reserve with the first, the second and so on. There are *Harry Potter* for the first, *Ben-Hur* for the second, *the Lord of the rings* for the third and *Matrix 2* for the fourth.

User : the second.

System : Which movie theater and what time at saturday do I reserve the *Ben-Hur* on at Saturday?

User : *MAEGA-BOX* at *five*.

FIG. 9B

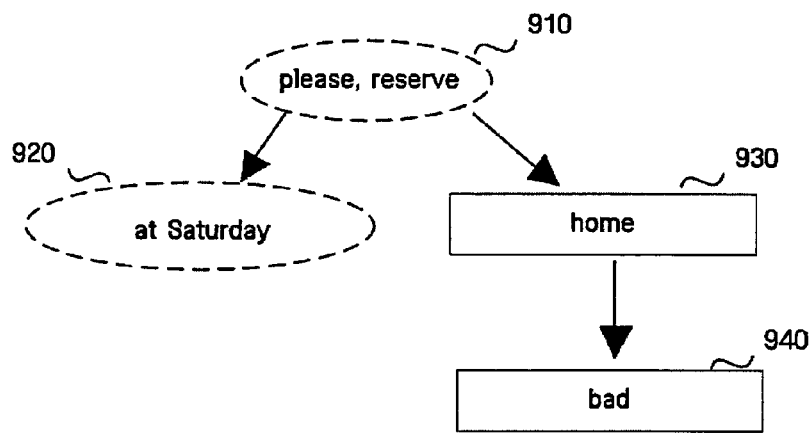

METHOD AND APPARATUS HANDLING SPEECH RECOGNITION ERRORS IN SPOKEN DIALOGUE SYSTEMS

CROSS-REFERENCE TO RELATED APPLICATION

This application claims the priority of Korean Patent Application No. 2003-54475 filed on Aug. 6, 2003 in the Korean Intellectual Property Office, the disclosure of which is incorporated herein by reference.

BACKGROUND OF THE INVENTION

1. Field of the Invention

The present invention relates to speech recognition technology, and more particularly, to speech recognition technology in which in order to handle any ambiguous portion which may be erroneously recognized during speech recognition, a speaker is questioned about contents of the ambiguous portion, and any ambiguous portion identified is cleared according to the speaker's response to the question.

2. Description of the Related Art

In conventional continuous speech recognition systems, although there may exist a region which may be erroneously recognized during speech recognition, no consideration has been given to the possibility that an error may be made, leading the recognition result to have low confidence. Even when attempts are made to estimate and eliminate any region in which acoustic or semantic errors may be caused, only results determined unilaterally in accordance with internal rules of the system are output. However, the internal rules of the system are very incomplete, resulting in a high error rate. As such, the speech recognition system does not have 100% accuracy. Thus, it is necessary to provide a method capable of enhancing low accuracy in a speech recognition rate in a spoken dialogue system.

Korean Patent Unexamined Publication No. 2001-0086902, titled "HUMAN RESPONSE-BASED SPEECH RECOGNITION APPARATUS", includes an ambiguity range extractor extracting ambiguity range from a sentence and a question generator generating questions to eliminate the ambiguity range. However, this invention does not consider how to ask the user questions in order to hold a successful and efficient dialogue between a speech recognition system and the user. In order to enhance intelligence, performance and convenience of the speech recognition system, phenomena generated in dialogues between human beings should be analyzed, thereby making the system such that efficiency, effectiveness and flexibility of the dialogue can be increased, as people utter.

In addition, U.S. Pat. No. 6,567,778, titled NATURAL LANGUAGE SPEECH RECOGNITION USING SLOT SEMANTIC CONFIDENCE SCORES RELATED TO THEIR WORD RECOGNITION CONFIDENCE SCORES, employs a method to form slots from results of speech recognition using information on specifications which an application program requires. The method determines a slot confidence score for each slot, such that when the slot confidence score is low, the user is questioned about the slot having the low slot confidence score. Since this method is highly dependent upon the application program, difficulty using the application program may cause problems with the method. For example, when an application program provides a plurality of domains at the same time, such as when the application program performs daily dialogue rather than task-oriented dialogue, or when the dialogue initiative is not taken only by a system, but by the user and the system, it is difficult to form slots. Therefore, it is difficult to use the method.

The foregoing techniques have no alternative to solve further failure problems when the speech recognition is not successful although the user is asked a question again. In such cases, it may be impossible to handle a command from the user. Therefore, in the spoken dialogue system or speech recognition system in which user's requests are handled by conducting a dialogue between the user and the system using speech as an interface, there is a need of a method capable of handling repeated errors when the errors in speech recognition are repeatedly generated.

SUMMARY OF THE INVENTION

To solve the above and/or other problems, an aspect of the present invention is to provide an apparatus and method of speech recognition with personal response, capable of reliably resolving acoustic and semantic errors which may be generated in speech recognition.

Another aspect of the present invention is to design a meta-dialogue capable of determining inclusion or non-inclusion of an error based on a result of speech recognition and providing effective recovery of an error in speech recognition when generated. The meta-dialogue is a dialogue resolving an error which is generated during a dialogue between a user and a system.

According to another aspect of the present invention, there is provided an apparatus for handling speech recognition errors in a spoken dialogue system. The apparatus includes a speech recognition unit, a recognition error determination unit and a meta-dialogue generation unit. The speech recognition unit extracts a speech feature of a speech signal inputted from a user and finds a phoneme nearest to the speech feature to recognize a word. The recognition error determination unit finds a sentence confidence based on a confidence of the recognized word, performs examination of a semantic structure of the sentence, and determines whether or not an error exists in the sentence according to a predetermined criterion based on both the sentence confidence and a result of examining the semantic structure of the sentence. Finally, the meta-dialogue generation unit generates a question to the user based on a content of a portion where the error exists, a type of the error and a position of the error in sentence.

According to another aspect of the present invention, there is provided a method for handling speech recognition errors in a spoken dialogue system, including extracting a speech feature of a speech signal inputted by a user and finding a phoneme nearest to the speech feature to recognize a word, determining whether or not an error exists in a sentence which is subject to speech recognition according to a predetermined criterion based on both a sentence confidence obtained from a confidence of the recognized word and a result of examining the semantic structure of the sentence, and generating a question to the user based on both a content of a portion where the error exists, a type of the error and position of error in sentence.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a flow chart illustrating operation S140 of FIG. 2, to determine whether an error exists in speech recognition;

FIG. 5 shows a table classifying meta-dialogue by type;

FIG. 7B shows an example of drafting a meta-dialogue for a literal sub-type relative to a reprise fragments type;

FIG. 7E shows an example of drafting a meta-dialogue relative to a gap type;

FIG. 9A illustrates the dialogue process between a user and a speech recognition apparatus of the present invention; and FIG. 9B shows a dependency tree making a sentence which a speech recognition apparatus recognizes with respect to the speech of the user of FIG. 9A.

DETAILED DESCRIPTION OF THE EMBODIMENTS

Figure 1:
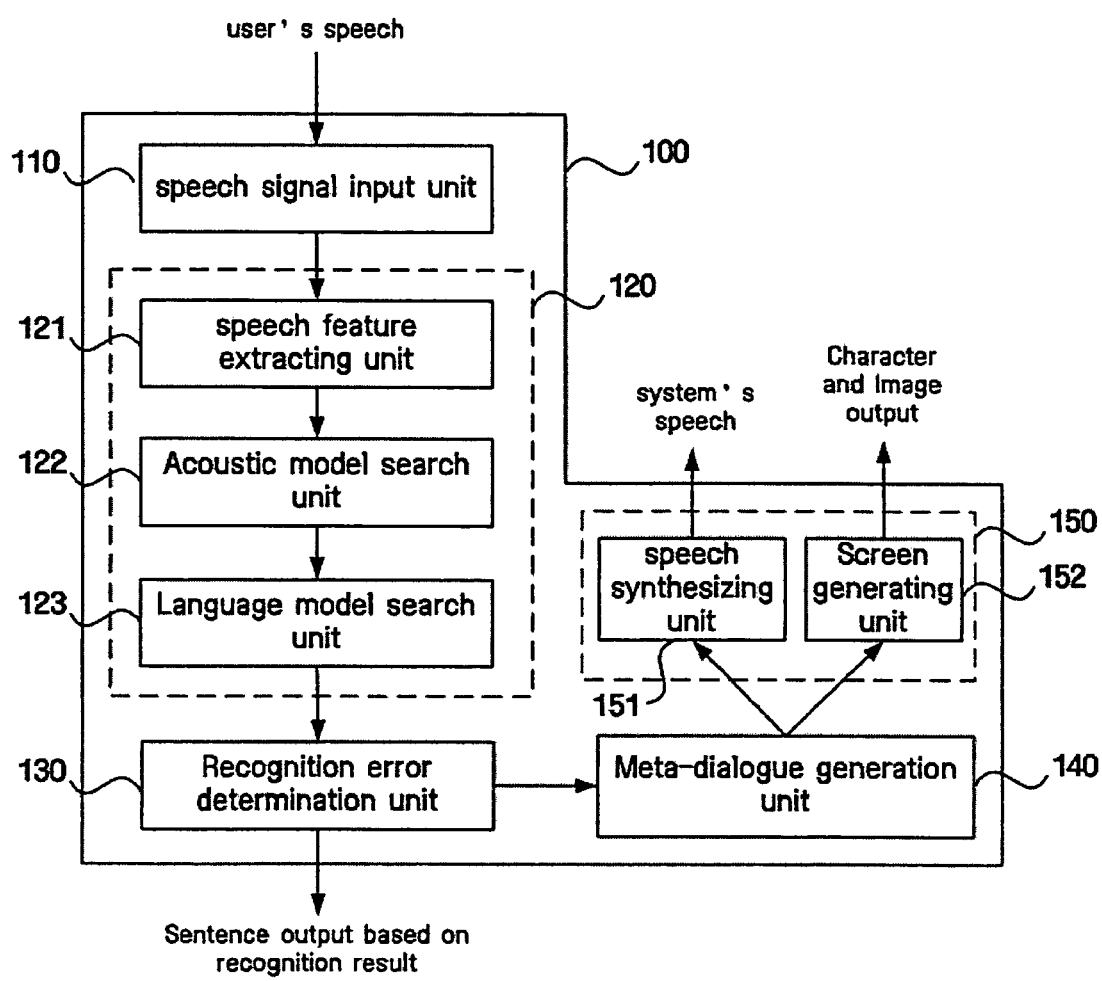
FIG. 1 is a block diagram illustrating an apparatus according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram illustrating a configuration of an apparatus according to an embodiment of the present invention. Referring to FIG. 1, an apparatus 100 includes a speech signal input unit 110, a speech recognition unit 120, a recognition error determination unit 130, a meta-dialogue generation unit 140, and a meta-dialogue output unit 150. Each component may be constructed as a combination of an information system with software executed by the information system.

The speech signal input unit 110 receives an analog speech signal spoken by a user, and may include a device such as a microphone.

The speech recognition unit 120 can be constructed using conventional methods. For example, the speech recognition unit 120 may include a speech feature extracting unit 121, an acoustic model search unit 122 and a language model search unit 123, wherein the speech feature extracting unit 121 converts the analog speech signal into digital data and extracts speech features, and the acoustic model search unit 122 searches a acoustic model for phonemes nearest to each speech feature, forms words from the searched phonemes, and calculates a probability value of the acoustic model which shows to what degree the formed word is identical to the word spoken by the user, and the language model search unit 123 generates a plurality of candidate words for a word to be subsequently recognized using a grammatical relation and a statistical connection between the words at a language model and calculates a probability value of the language model with respect to each candidate word. Preferably, the acoustic and language models are constructed in a database type in the information system.

The recognition error determination unit 130 finds a confidence of a sentence based on the words recognized by the speech recognition unit 120, builds a dependency tree of a recognized sentence to examine a semantic structure of the recognized sentence, and checks whether there is an error in the recognized sentence or not. This process is done according to a predetermined criterion synthesizing the sentence confidence as well as a result of examining the semantic structure of the recognized sentence.

The meta-dialogue generation unit 140 generates dialogue so that an error in the speech recognition can be resolved by requesting the user to speak again the portion causing the error. The meta-dialogue generation unit 140 generates dialogue suitable to transmit at least one of the following types of speeches: non-reprise clarifications, reprise sentences, reprise fragments, gaps and gap fillers. The generated speech takes into consideration a content of the portion in which the error is generated, in the sentence and a type of the error, and transmission of the generated speech to the user by means of the meta-dialogue output unit 150.

The meta-dialogue output unit 150 transmits at least one question generated from the meta-dialogue generation unit 140 to the user through speech or a screen. The meta-dialogue output unit 150 includes a speech synthesizing unit 151 and a screen generating unit 152. The speech synthesizing unit 151 synthesizes the generated question and outputs the synthesized result to the external user through speech, and the screen generating unit 152 outputs the generated question onto the screen and outputs a menu through which the user is allowed to select any one of the items thereon.

Figure 2:
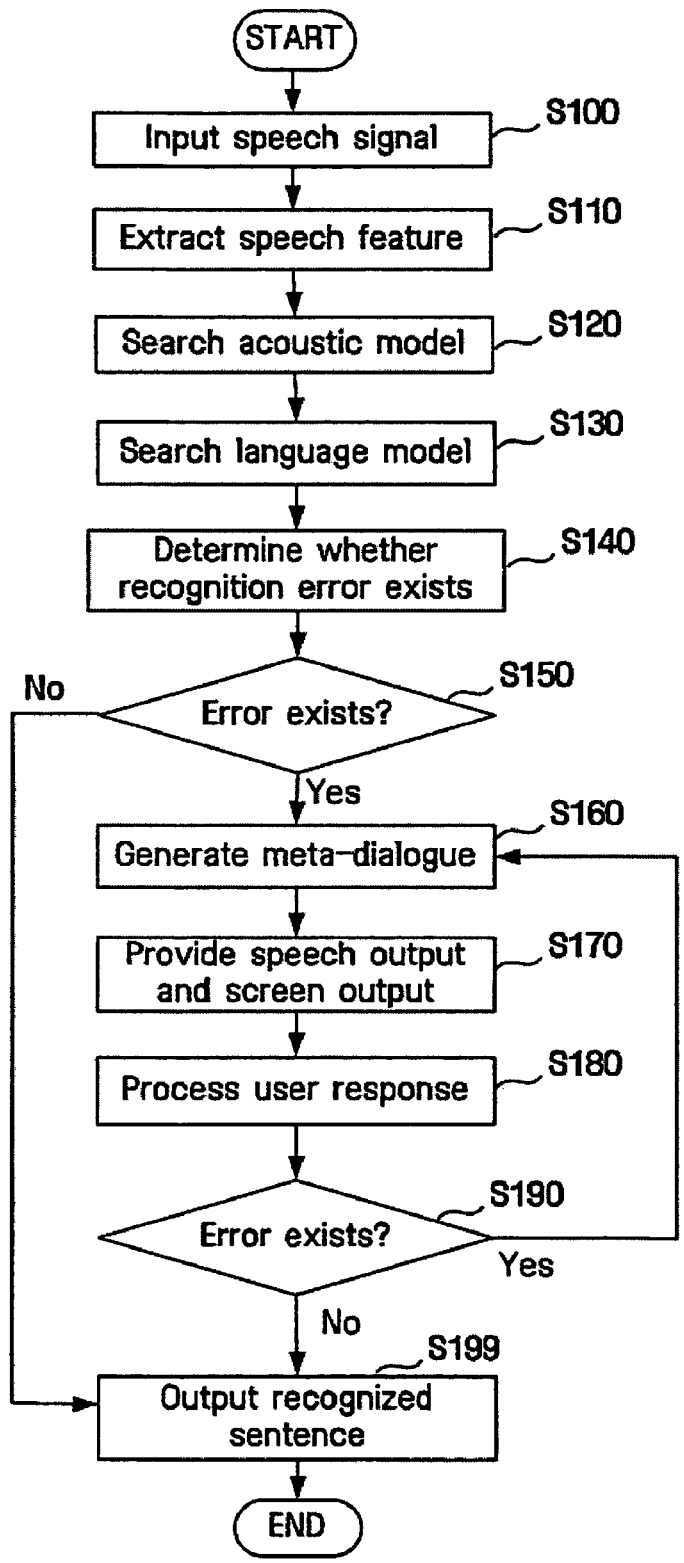
FIG. 2 is a flow chart illustrating a method according to an embodiment of the present invention.

FIG. 2 is a flow chart illustrating method according to an embodiment of the present invention. When an analog speech signal is inputted through the speech signal input unit 110, the inputted analog speech signal is converted into speech feature digital data (S100). Then, a frequency characteristic is extracted from the converted digital data at a predetermined interval (frame) by the speech feature extracting unit 121 and is subjected to vector quantification. The vector-quantified frequency characteristic is used as the speech feature (S110). The speech features corresponding to each phoneme in an acoustic model and the degree of similarity between them are compared by the acoustic model search unit 122, to thereby search for the phonemes having the highest degree of similarity and the searched phonemes are generated into a word (S120). Subsequently, the language model search unit 123 predicts the current word and recognizes the next word using a language model. A plurality of candidate words are generated for the next word and are all connected in a lattice structure. Further, each candidate word is calculated for a probability value on the end of the sentence, and one or more recognition candidate sentences are generated (S130). In this manner, operations S110 to S130 are performed in the speech recognition unit, but these operations may be performed using conventional methods. Next, the recognition error determination unit 130 checks whether there is an error in the recognized sentence according to a predetermined criterion based on the sentence confidence and the semantic structure examination of the recognized sentence (S140). Operation S140 of checking the recognition error will be described in more detail with reference to FIG. 4A.

When determined that there is no error in the recognized sentence, the recognized sentence is outputted, and the recognized result is used for desired purposes (S199). However, when determined that there is an error in the recognized sentence, the meta-dialogue generation unit 140 generates a meta-dialogue, which allows the speech recognition error to be corrected through dialogue with the user (S160). The generated meta-dialogue is outputted either in form of speech or onto a screen by either the speech synthesizing unit 151 or the screen generating unit 152, in which the user is able to make a response (S170). Then, the user gives a response to a question in the meta-dialogue again, and the spoken dialogue system processes the user's response (S180). In processing the user's response, the speech signal resulting from the dialogue between the user and the system is received, and the response is processed through operations S110 to S130. Furthermore, in operation S140, the spoken dialogue system checks whether the speech recognition error is present or not, and then whether there is an error in the recognized sentence or not according to a predetermined criterion synthesizing results of the sentence confidence and the semantic structure examination of the recognized sentence (S190).

When determined that there is an error in the recognized sentence, the meta-dialogue is generated again and then the process is returned to operation S160 for holding a dialogue with the user, and the following operations are repeated. By contrast, when determined that there is no error in the sentence, the recognized sentence is outputted, and the recognized result is used for a desired purpose (S199).

FIG. 3 is a flow chart illustrating in detail operation S140 of FIG. 2. The confidence of the recognized sentence is examined using the confidence of each word forming the recognized sentence (S122), and the semantic structure of the sentence is examined (S123). Finally, based on the results of the examination of the sentence confidence and the semantic structure of the recognized sentence, the recognized sentence is categorized into Accept, Reject or Confirm (S124).

Figure 4A:
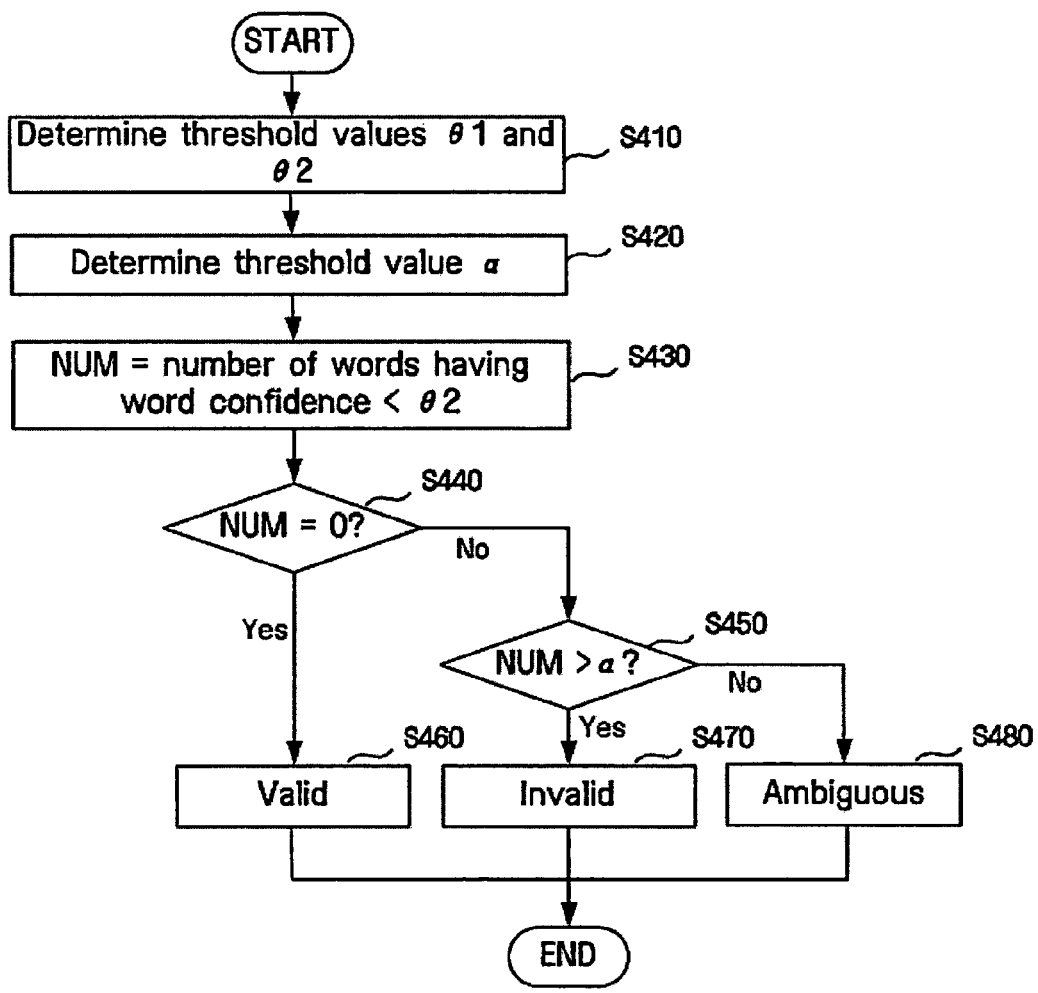
FIG. 4A is a flow chart illustrating operation S122 to find the sentence confidence using the word confidence of FIG. 3.

FIG. 4A is a flow chart illustrating operation S122 to find the sentence confidence using the word confidence of FIG. 3. The word confidence may be found using conventional methods. For example, the word confidence may be calculated using the acoustic and language models at the speech recognition unit 120, and may be attached to each word and expressed numerically. This word confidence can be acquired using the method as previously disclosed in Korean Unexamined Patent Publication No. 2001-86902.

Figure 4B:
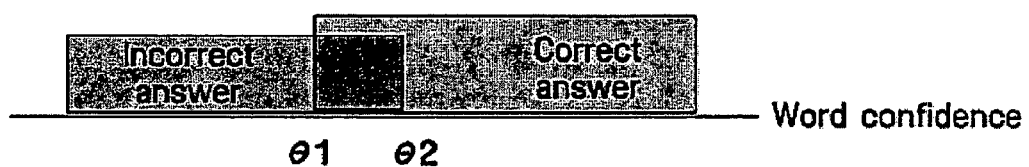
FIG. 4B shows a way to experimentally find $\theta_1$ and $\theta_2$ which are criteria to determine a word confidence.

A method of checking whether or not there is an error in the sentence using the word confidence is as follows. When a speech recognizer represents word confidence values of the words, which belong to the sentence obtained from a result of the speech recognition experiment, on a straight line together with correctness or incorrectness of each word, it is possible to get threshold values, $\theta 1$ and $\theta 2$, as shown in FIG. 4B (S410). In the conventional art, correctness or incorrectness of each word is determined by a single threshold value. If a certain word has the word confidence beyond the single threshold value, the word is determined as the correct answer. If not, the word is determined as the incorrect answer. However the words having the word confidence near the threshold value may be determined either as the correct or incorrect answer according to circumstances even when they have the identical word confidence. Because of this problem, in the present invention, the threshold value is set to two, $\theta 1$ and $\theta 2$. All words may be classified by three kinds. Specifically, when they have the word confidence greater than $\theta 2$, they are determined as the correct answer, and when less than $\theta 1$, they are determined as the incorrect answer. When greater than $\theta 1$ and less than $\theta 2$, they are determined as any one of the two answers.

Next, there is another threshold value, $\alpha$, with respect to the number of words, each of which has an error or a possible error in the sentence. The threshold value, $\alpha$, may be determined through an experiment as a value required by the user according to a use environment (S420). When an N-best hypothesis is yielded as a result of the speech recognition at the speech recognition unit 120, the processes following operation S430 of FIG. 4A are performed relative to N sentences beginning with a higher class of sentence in turn. The number of the words having the word confidence less than $\theta 2$ is accounted (S430). Assuming that the number is called NUM, a category of the sentence is determined by a comparison between a value of the NUM and the threshold value. When the NUM value is 0 (zero), all words belong to the correct answer, and thus the sentence is determined to be valid (S460). When the NUM value is greater than the threshold value $\alpha$, the words of the sentence exceed the number of allowable errors, and thus the sentence is determined to be invalid (S470). When the NUM value is equal to or greater than 1 (one), and less than or equal to $\alpha$, the sentence is determined to be ambiguous (S480). When a certain sentence is determined to be valid, the remaining sentences are not subject to the process of checking the recognition error. When N sentences are all determined to be invalid or ambiguous, they are sequentially subject to the semantic structure examination beginning with the uppermost sentence (S123).

Figure 4C:
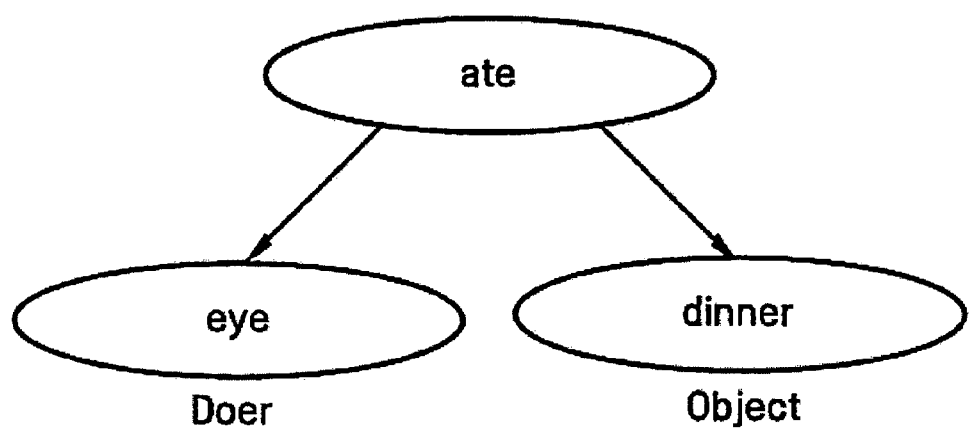
FIG. 4C shows an example of making a dependency tree of a sentence according to a result of speech recognition in order to examine a semantic structure of the sentence.

After the test of the foregoing sentence confidence is completed, it is checked whether the sentence according to the result of the speech recognition is semantically valid (S123). For example, if a sentence of "Eye ate dinner." which is derived from the result of the speech recognition of a sentence of "I ate dinner." spoken by a user, is subject to a syntax analysis and a thematic role analysis, a dependency tree to which the thematic role is attached can be obtained as shown in FIG. 4C. As shown in the FIG. 4C, when the verb "eat" has two arguments for doer and object, information on selection restriction based on the thematic role is exemplified as follows:

[eat, doer:@person; object:@food]

Thus, a doer argument of the verb "eat" has a noun, indicating a person and an object argument thereof has another noun, indicating food. As a result of the speech recognition, the noun of "Eye" for the status of the doer does not point to the person. As such, the sentence of "Eye ate dinner." is determined to be an invalid or semantically incorrect sentence.

The results of examining both the sentence confidence and the sentence semantic structure are combined, whereby the speech recognition error is finally determined. For the examination of the sentence confidence, the sentence is divided into three: "Invalid," "Ambiguous" and "Valid." For the examination of the sentence semantic structure, the sentence is divided into two: "Invalid" and "Valid." Here, the "Invalid" means that an error is generated, the "Ambiguous" means that there is a possibility that an error is generated, and the "Valid" means that no error is generated. In the speech recognition, the results of examining both the sentence confidence and the sentence semantic structure are combined, whereby it is determined whether to Accept, Reject or Confirm the sentence as in Table 1 shown below. When both the sentence confidence and the sentence semantic structure are invalid, the sentence is rejected. When the sentence confidence is invalid but the sentence semantic structure is valid, the sentence may be incidentally understood and thus is rejected. When the sentence confidence is ambiguous, the user is required to confirm the sentence regardless of whether the sentence semantic structure is valid or not. When the sentence confidence is valid but the sentence semantic structure is invalid, the user is also required to confirm the sentence. Finally, when both the sentence confidence and the sentence semantic structure are valid, the sentence is accepted.

TABLE 1

|  | Semantic structure | |
| --- | --- | --- |
| Confidence | Invalid | Valid |
| Invalid | Reject | Reject |
| Ambiguous | Confirm | Confirm |
| Valid | Confirm | Accept |

As a result of determining the error of the sentence, when it is determined that the sentence is rejected or confirmed, a meta-dialogue is generated. When a certain person misunderstands the counterpart's speech, the person generates various types of speeches in response to the misunderstanding. On the basis of the paper of Matthew Purver, "ON THE MEANS FOR CLARIFICATION DIALOGUE," in which such types of human speech are analyzed and classified, the meta-dialogue is classified into various types as in FIG. 5.

A non-reprise clarifications type 510 requests a user to give a response without using information on the speech of the user. A reprise sentences type 520 repeats the previous sentence, having two sub-types, a "literal sub-type" which simply repeats the previous sentence and a "wh-substitued sub-type" which substitutes only an unrecognized portion with an interrogative and then repeats the previous sentence. A reprise sluices type 530 employs a type of interrogative sentence having only an interrogative, i.e., an elliptical wh-construction. A reprise fragments type 540 asks a question including a part of user's speech, and has two sub-types, a "literal sub-type" and a "wh-substituted sub-type," like the reprise sentences type 520. A gap type 550 utters the first part of ambiguous words. A gap filler type 560 infers an incomplete part of an incomplete sentence. And, the conventional type 570 indicates a complete breakdown in communication.

When any response speech is generated by the system, an efficient dialogue must be pursued to the extent that the user is not to be confused. In an exemplary embodiment of the present invention, excepting the reprise sluices type 530 and the conventional type 570 which may cause the user to give rise to confusion on the content of a question, the remaining five types of speeches are used as the speech or dialogue in the meta-dialogue.

Figure 6:
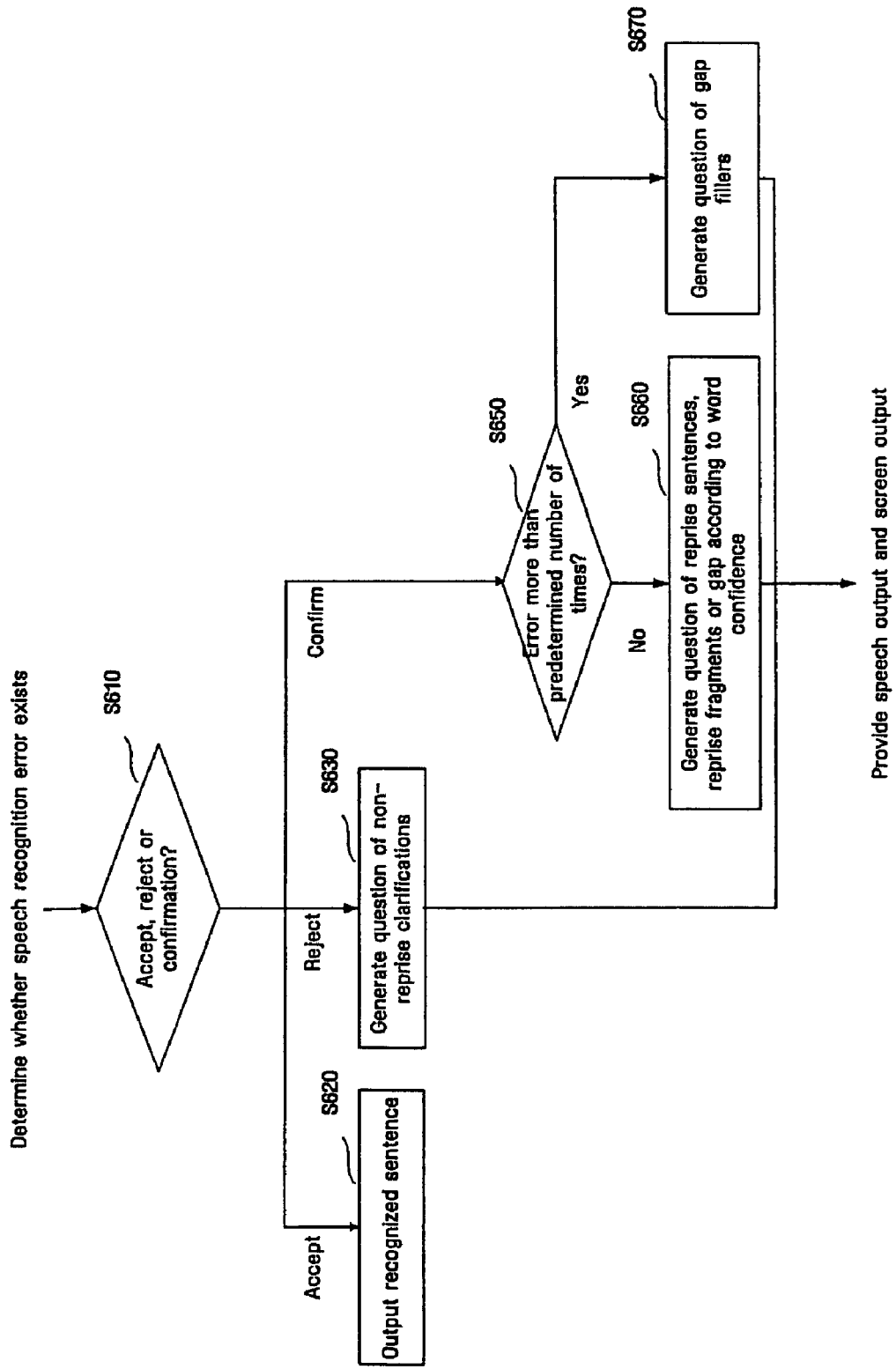
FIG. 6 is a flow chart illustrating operation S160 to generate the meta-dialogue FIG. 2.

FIG. 6 is a flow chart illustrating operation S160 to generate the meta-dialogue of FIG. 2. It is determined which one of Accept, Reject and Confirm is derived from the result classified in the process of determining the existence or non-existence of the speech recognition error with respect to the corresponding sentence (S610). As a result of the determination, when the sentence belongs to the Accept, the sentence is determined to be a correctly recognized one, and thus, the recognized sentence is outputted (S620) and can be used to process the resulting command and the like. When the sentence belongs to the Reject, the sentence is determined to be an incorrectly recognized sentence, and thus, the user is asked the question of the non-reprise clarification type 510 (S630).

Meanwhile, when the sentence belongs to the Confirm, the sentence is determined that it can be incorrectly recognized, and thus, the user is asked the question of the reprise clarification type 520, the reprise fragments type 540 or the gap type 550 according to a structure, an error position and an error type of the sentence (S660). When a particular content or word of the sentence continuously generates errors more than a predetermined number of times (S650), the user is asked the question of the gap fillers type 560 with respect to the word (S670). The method of asking the question in this manner may be selected from one in which the user is able to respond to the question with different words corresponding to each candidate word, or another one in which the candidate words are visually represented and are selected by the user with various inputting devices, and so on.

Referring to operation S660, in order to get a confirmation on a portion which is not properly recognized, the content and structure to be included in the meta-dialogue are determined from the result of the speech recognition. On this basis, the type of the meta-dialogue is determined. There are two methods capable of getting a confirmation on the misrecognized portion confirmation from the user. The first method is using an interrogative, and the second method is using an interrogative sentence keeping the misrecognized word intact. In an embodiment of the present invention, the first method is defined as an explicit confirmation, and the second method is defined as an implicit confirmation. Each word is subject to the following examination.

Referring to FIG. 4B and Table 2, when the word confidence is less than $\theta1$ or the word of interest is semantically unacceptable, the explicit confirmation is performed relative to the word. When dependency of a noun phrase on a verb group is semantically incorrect, it is determined that, of the noun phrase and verb group, one having a lower word confidence has an error. When the word confidence is more than $\theta1$ and less than $\theta2$, the implicit confirmation is performed relative to the word. When the word confidence is more than $\theta2$, it is determined that the word is correctly recognized, and thus, that portion or word is not included in the meta-dialogue.

TABLE 2

|  | Method | Object | Result |
| --- | --- | --- | --- |
| Inclusion | Explicit confirmation | $WC < \theta1$ Semantically invalid | Interrogative substitution |
|  | Implicit confirmation | $\theta1 \leq WC \leq \theta2$ | Keep the phrase intact |
| Omission |  | $WC > \theta2$ |  |

WC: word confidence

Each node of the dependency tree may have one or more words. When one node has two or more words, the node functions as an explicit confirmation node when at least one word belongs to the explicit confirmation. The node functions as an implicit confirmation node when no node belongs to the explicit confirmation but at least one word belongs to the implicit confirmation, and the node functions as an omission node when all words belong to omission. In this manner, when any one of the explicit confirmation, the implicit confirmation and the omission is determined for each node, a sentence is made up while searching for the tree. When the node of interest belongs to the explicit confirmation, a proper interrogative is selected according to the thematic role of the node and a noun semantic category of the node. When the node is the confirmation node while searching for the node, the confirmation node and all parent nodes from the confirmation node to a root of the tree are included in the sentence. Here, although the parent node is determined for the omission, the parent node is included in the sentence in order to make the sentence correct. However, in order to make the sentence effective through removal of an undesired node, only when the node of interest belongs to a noun clause and the parent nodes of the noun clause are not the confirmation node, the parent nodes reaching the root of the noun clause are included (e.g., see FIG. 7A). When a certain sentence is made up while searching for the tree on the basis of this principle, various types of meta-dialogues are formed as in the examples of FIGS. 7A to 7E. The sentence taking a tree form in each figure is to denote a recognized sentence, and the sentence following the symbol, "S:" is to denote an interrogative construction where the apparatus of the present invention asks a question to the user.

Figure 7A:
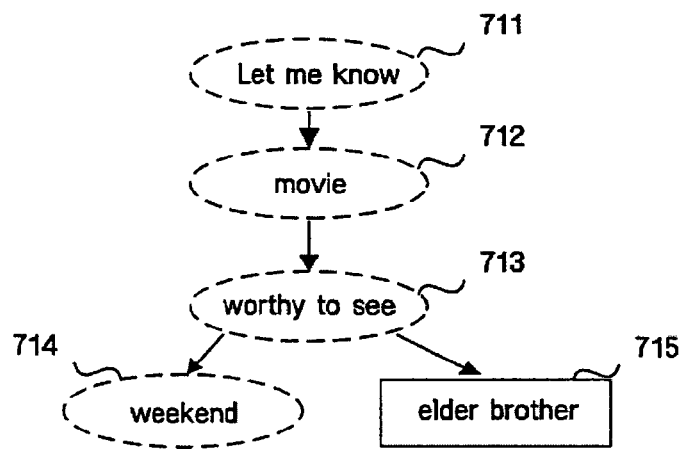
FIG. 7A shows an example of drafting a meta-dialogue for a wh-substituted sub-type relative to a reprise fragments type.

FIG. 7A shows an example of drafting a meta-dialogue for a wh-substituted sub-type relative to a reprise fragments type. Here, a word of "elder brother" 715 has the speech confidence less than θ1 and thus is required for the explicit confirmation. Thus, the portion of "elder brother" is substituted by an interrogative of "who" and a question is asked. In this case, the node of "elder brother" 715 belongs to a noun clause of "a movie worthy for the elder brother to see," a question is given including the parent node as the uppermost node of "movie" 712 within the noun clause. Thus, the result is as follows: "A movie worthy for who to see?"

FIG. 7B shows an example of drafting a meta-dialogue for a literal sub-type relative to a reprise fragments type. Here, a word of "elder brother" 725 has the speech confidence between θ1 and θ2, and thus is required for the implicit confirmation. Thus, as in FIG. 7A, the node of "elder brother" 725 belongs to a noun clause, a question is given including the parent node of "movie" 722 within the noun clause. Thus, the result is as follows: "A movie worthy for the elder brother to see?"

Figure 7C:
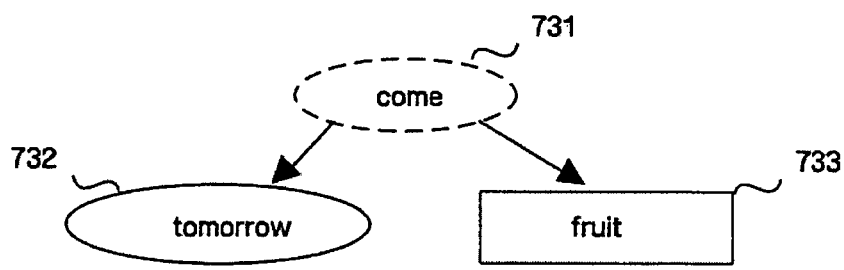
FIG. 7C shows an example of drafting a meta-dialogue for a wh-substituted sub-type relative to a reprise sentences type.

FIG. 7C shows one example of drafting a meta-dialogue for a wh-substituted sub-type relative to a reprise sentences type. Here, a word of "fruit" 733 has the speech confidence less than θ1 and thus is required for the explicit confirmation. Further, a word of "tomorrow" 732 has the speech confidence between θ1 and θ2, and thus is required for the implicit confirmation. Unlike that of FIG. 7A, the word of interest does not belong to a noun clause, an entire sentence is repeated, and the word of "fruit" 733 is replaced by an interrogative. The word of "tomorrow" 732 is repeatedly questioned. Therefore, the result is as follows: "What comes tomorrow?"

Figure 7D:
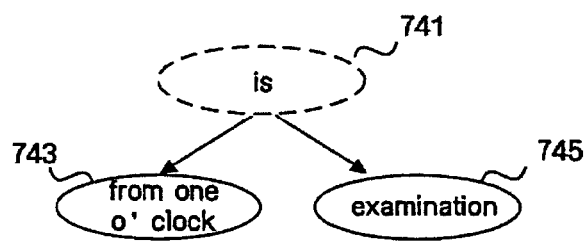
FIG. 7D shows an example of drafting a meta-dialogue for a literal sub-type relative to a reprise sentences type.

FIG. 7D shows an example of drafting a meta-dialogue for a literal sub-type relative a reprise sentences type. Here, two words of "from one o'clock" 743 and "examination" 745 have the speech confidence between θ1 and θ2, and thus are required for the implicit confirmation. Thus, the two words are repeatedly questioned again as they are recognized. The result is as follows: "There is an examination from one o'clock?"

FIG. 7E shows an example of drafting a meta-dialogue for a gap type. Here, continuous words, "from one o'clock" 754, "today" 755 have the speech confidence less than θ1 and thus are all required for the explicit confirmation. In this case, the speech is given to the portions ahead of the ambiguous and continuous words. Thus, the result is as follows: "There is an examination for two hours what?"

Now, the dialogue form of the gap filler type belonging to operation S670 of FIG. 6 will be described below. The question of the gap filler type can be applied to the case that the error is continuously generated more than a predetermined number of times. With regard to the speech recognition, there is a problem called "Out of Vocabulary (OOV)." When the problem of OOV is generated, a sentence will not be properly recognized although the user responds to the question of the reprise sentences type, the reprise fragment sentence or the gap type. In particular, this phenomenon is easily generated under the environment where many newly coined words are used as the case that the spoken dialogue system is used in information retrieval applications over Internet, such as for a movie title. In this case, repetition of the question provides the user with a burden of the speech, especially when it is impossible to make a success of the speech recognition, and furthermore it is a waste of time to use the speech recognizer. As such, this is regarded to be unfavorable. For this reason, when the problem of OOV is generated, two methods can be applied, one which allows the user to make a response with different words corresponding to candidate words one by one, and the other method which visually represents the candidate words and then allows the user to select at least one of the represented candidate words through various input devices.

As for the former method, it is assumed that the user utters a certain sentence of "This ninth day, please reserve 'Ben-Hur' at theater Mega-Box" but "Ben-Hur" is not recognized properly. Here, when the recognition error is generated more than a predetermined number of times even through the meta-dialogue of "Reserve what?," a new meta-dialogue is generated so as to replace the unrecognizable "Ben-Hur" with a recognizable "the second" and represent the replaced result, as follows: "Please respond to which film you wish to reserve, with the first, the second and so on. There are Harry Potter for the first, Ben-Hur for the second, the Lord of the Rings for the third." Here, when the user answers the question with "the second" the spoken dialogue system recognizes the word of "the second" and then converts it into "Ben-Hur". Eventually, the spoken dialogue system can recognize the sentence of "This ninth day, please reserve the Ben-Hur at theater Mega-box."

Figure 8:
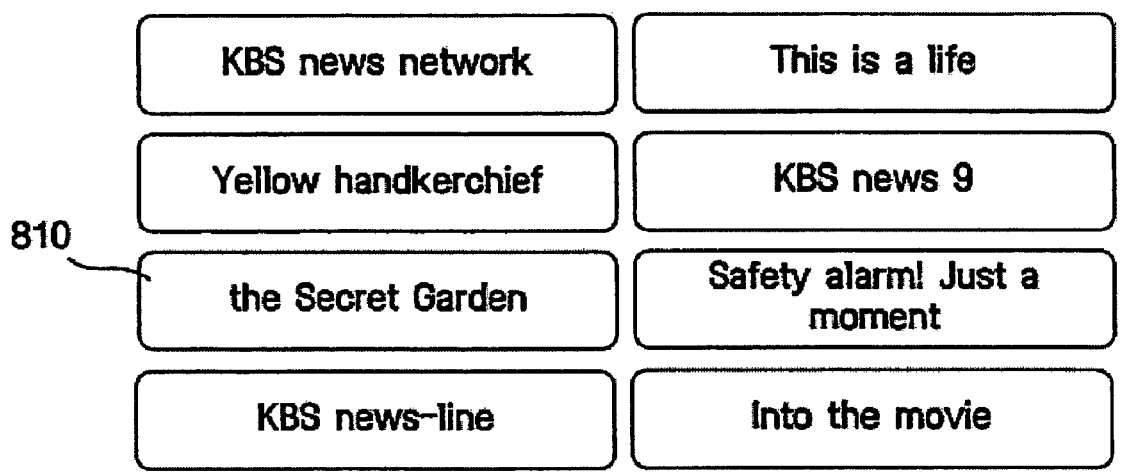
FIG. 8 shows an example of a display screen of hardware (robot, PC, etc.) having a spoken dialogue system.

When the user has a difficulty in memorizing due to too many candidates, the difficulty is settled through a multi-modal interface. Especially, this becomes further useful when the spoken dialogue system is realized in personal computers (PCs) or robots. As shown in FIG. 8, it is assumed that the user utters a certain sentence of "Today, record the Secret Garden" for a speech recognizable robot having a touch screen. When the portion of "the Secret Garden" 810 is incorrectly recognized and the recognition error is repeated, a list of recordable programs is represented together with the system's speech of "Please select a program you want to record." In this case, when the user selects an item of "the Secret Garden" 810 using a keyboard or the touch screen, the spoken dialogue system can handle a sentence of "Record the Secret Garden today."

FIG. 9A illustrates an operation of the present invention as a whole, in particular a dialogue between a user and a spoken dialogue system, wherein the spoken dialogue system of the present invention is used in a movie reservation application. As shown, when the user utters a sentence of "Saturday, please reserve 'Ben-Hur'." the spoken dialogue system recognizes the word of "Ben-Hur" to be "Bad Home" and makes up the dependency tree as in FIG. 9B with respect to the recognized sentence. The words of "Bad" and "Home" which are recognized from the dependency tree belong to the explicit confirmation, and thus, a sentence of "Reserve what?" including their parent node of "reserve" is formulated. The speech recognition system recognizes the word of "Ben-Hur" with which the user makes a response again, to be a word of "Batter". Assuming that the predetermined number of times of operation S650 in FIG. 6 is two, the spoken dialogue system which made two errors in the recognition asks the question of the gap fillers type. When the user answers the question with "the second" the spoken dialogue system can correctly recognize the original sentence uttered by the user. Further, the spoken dialogue system additionally questions the user about a place and a time in order to handle the demand of the user.

According to the present invention, the spoken dialogue system has an improved speech recognition rate and a dialogue success rate, thus enhancing entire performance.

Further, when an error is generated during speech recognition, the spoken dialogue system decreases the number of times the system attempts to recognize the spoken word as well as a volume of speech, so that it is possible to promote convenience of the user who makes use of the spoken dialogue system.

The aforementioned method of handling speech recognition errors may be embodied as a computer program that can be run by a computer, which can be a general or special purpose computer. Thus, it is understood that the system can be such a computer. Computer programmers in the art can easily reason codes and code segments, which constitute the computer program. The program is stored in a computer readable medium readable by the computer. When the program is read and run by a computer, the method of handling speech recognition errors is performed. Here, the computer-readable medium may be a magnetic recording medium, an optical recording medium, a carrier wave, firmware, or other recordable media.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus handling speech recognition errors in a spoken dialogue system, comprising:
    a speech recognition unit extracting a speech feature of a speech signal inputted from a user and finding a phoneme nearest to the speech feature to recognize a word;
    a recognition error determination unit finding a sentence confidence based on a confidence of the recognized word, inspecting a semantic structure of a recognized sentence, and determining whether an error exists in the recognized sentence which is subject to speech recognition according to a predetermined criterion based on both the sentence confidence and a result of inspecting the semantic structure of the recognized sentence; and
    a meta-dialogue generation unit generating a question questioning the user about the recognized sentence based on a content of a portion where the error exists and a type of the errors,
    wherein the question is adapted so that, after both a confidence $\theta_2$ determined that each word is a correct answer and another confidence $\theta_1$ determined that each word is an incorrect answer are obtained, the word is substituted by an interrogative when the confidence of each recognized word is less than $\theta_1$, the word is omitted without repetition when the confidence of each recognized word is greater than $\theta_2$, and a phrase of the recognized word is repeatedly questioned when the confidence of each recognized word is greater than or equal to $\theta_1$, and is less than or equal to $\theta_2$.

2. The apparatus as claimed in claim 1, further comprising a speech signal input unit receiving an analog speech signal uttered by the user through a microphone.

3. The apparatus as claimed in claim 1, further comprising a meta-dialogue output unit transmitting the question generated from the meta-dialogue generation unit to the user through one of a speech and a display screen.

4. The apparatus as claimed in claim 3, wherein the meta-dialogue generation unit further includes:
    a speech synthesizing unit synthesizing the generated question in the form of speech and outputting the generated question to the external user; and
    a screen generating unit outputting the generated question onto the display screen and outputting a menu allowing the user to select a desired answer to the generated question.

5. The apparatus as claimed in claim 1, wherein the sentence confidence is obtained using a threshold value $\theta_2$ of the confidence used to determine whether each recognized word is a correct answer or not, a threshold value $\theta_1$ of the confidence used to determine whether each recognized word is an incorrect answer, and a threshold value $\alpha$ of a number of words having any one of the errors and a possibility of the error which exists in the sentence and are capable of determining that the sentence is not valid.

6. The apparatus as claimed in claim 1, wherein the sentence confidence is determined by a validity of the sentence, and, the sentence is valid when a number of words (NUM) value is 0 (zero), the sentence is not valid when the NUM value is greater than $\alpha$, and that the sentence is ambiguous when the NUM value is equal to or greater than 1 (one) and equal to or less than $\alpha$, wherein the number of the words having the word confidence less than $\theta_2$ is called NUM.

7. The apparatus as claimed in claim 1, wherein in an inspection of the semantic structure, the sentence recognized through the speech recognition unit is parsed so as to create a dependency tree, and to determine whether a meaning of each argument constituting the dependency tree is valid.

8. The apparatus as claimed in claim 6, wherein the determination of whether the error exists in the speech-recognized sentence is made after determining whether the sentence is valid or invalid according to a result of examining the semantic structure of the sentence,
    the sentence is rejected when the confidence of the determined sentence is not valid, the sentence is accepted when the confidence of the determined sentence is valid and when the result of examining the semantic structure of the sentence is valid, and the user is requested to confirm the sentence in other cases.

9. The apparatus as claimed in claim 1, wherein the question is adapted so that, when a recognition error is generated at a particular portion of the recognized sentence more than a predetermined number of times, both candidate words of the word and other words corresponding to each candidate word are represented, and the user selects the other words corresponding to each candidate word.

10. The apparatus as claimed in claim 1, wherein the question is adapted so that, when a recognition error is generated at a particular portion of the recognized sentence more than a predetermined number of times, candidate words of the word are visually represented, and the user selects the candidate words.

11. The apparatus as claimed in claim 1, wherein the question employs any one of a non-reprise clarifications type, reprise sentences type, a reprise fragments type, gaps type and gap fillers type according to the confidence of each word forming the recognized sentence, when the recognition error is generated at a particular portion of the sentence less than a predetermined number of times.

12. The apparatus as claimed in claim 1, wherein the question is adapted so that, when one particular word generating the recognition error is a confirmation node on a dependency tree, parent nodes up to a top of the dependency tree are included.

13. The apparatus as claimed in claim 1, wherein the question is adapted so that, when one particular word generating the recognition error is a confirmation node on a dependency tree, when a parent node of the corresponding node has no error, and, when the node is included in a noun clause, parent nodes up to a top within the noun clause are included.

14. The apparatus as claimed in claim 1, wherein the question is adapted so that, when the recognition error of continuous words is generated, a portion ahead of the continuous words generating the recognition error is included.

15. A method of handling speech recognition errors in a spoken dialogue system, comprising:
   extracting a speech feature of a speech signal inputted by a user and finding a phoneme nearest to the speech feature to recognize a word;
   determining whether an error exists in a sentence which is subject to speech recognition according to a predetermined criterion based on both a sentence confidence obtained from a confidence of the recognized word and a result of examining a semantic structure of the sentence; and
   generating a question questioning the user about the recognized sentence based on both a content of a portion where the error exists and a type of the errors,
   wherein the question is adapted so that, after both a confidence $\theta_2$ determined that each word is a correct answer and another confidence $\theta_1$ determined that each word is an incorrect answer are obtained, the word is substituted by an interrogative when the confidence of each recognized word is less than $\theta_1$, the word is omitted without repetition when the confidence of each recognized word is greater than $\theta_2$, and a phrase of the recognized word is repeatedly questioned when the confidence of each recognized word is greater than or equal to $\theta_1$, and is less than or equal to $\theta_2$.

16. The method as claimed in claim 15, further comprising receiving an analog speech signal uttered by the user through a microphone.

17. The method as claimed in claim 15, further comprising transmitting the generated question to the user through one of a speech and a screen.

18. The method as claimed in claim 15, wherein the sentence confidence is obtained using a threshold value $\theta_2$ of the confidence used to determine whether each word is a correct answer or not, a threshold value $\theta_1$ of the confidence used to determine whether each word is an incorrect answer or not, and a threshold value $\alpha$ of a number of words having any one of the error and a possibility of the error which exists in the sentence and are capable of determining that the sentence is not valid.

19. The method as claimed in claim 15, wherein the sentence confidence is obtained bys:
   determining the sentence to be valid when a number of words (NUM) value is 0 (zero);
   determining the sentence to be invalid when the NUM value is greater than $\alpha$; and
   determining the sentence to be ambiguous when the NUM value is equal to or greater than 1 (one) and less than or equal to $\alpha$, wherein the number of the words having the word confidence less than $\theta_2$ is called NUM.

20. The method as claimed in claim 15, wherein the examining of the semantic structure includes:
   parsing the recognized sentence through a speech recognition unit and forming a dependency tree to which a thematic role is attached; and
   determining whether a meaning of each argument forming the dependency tree is valid.

21. The method as claimed in claim 19, wherein the determination of whether the error exists or not in the recognized sentence includes:
   examining the semantic structure of the recognized sentence to determine whether the recognized sentence is valid or not; and
   classifying the recognized sentence into three types: rejecting the recognized sentence when the confidence of the recognized sentence is not valid, accepting the recognized sentence when the confidence of the recognized sentence is valid and when the result of examining the semantic structure of the recognized sentence is valid, and requesting the user to confirm the recognized sentence in other cases.

22. The method as claimed in claim 15, wherein the generation of the question includes:
   finding a confidence $\theta_2$ determining that each word is a correct answer and another confidence $\theta_1$ determining that each word is an incorrect answer;
   substituting the word with an interrogative when the confidence of each recognized word is less than $\theta_1$, and omitting the word without repetition when the confidence of each recognized word is greater than $\theta_2$; and
   repeatedly questioning a phrase of the recognized words when the confidence of each recognized word is greater than or equal to $\theta_1$ and less than $\theta_2$.

23. The method as claimed in claim 15, wherein the generation of the question includes:
   representing both candidate words of the word and other words corresponding to each candidate word when the recognition error is generated at a particular portion of the sentence more than a predetermined number of times; and
   selecting, by the user, the other words corresponding to each candidate word.

24. The method as claimed in claim 15, wherein the generation of the question includes:
   visually representing candidate words of the word when the recognition error is generated at a particular portion of the sentence more than a predetermined number of times; and
   selecting, by the user, the candidate words by an input device.

25. The method as claimed in claim 15, wherein the generation of the question includes, when a recognition error is generated at a particular portion of the sentence less than a predetermined number of times, selecting any one question of a non-reprise clarifications type, a reprise sentences type, a reprise fragments type, gaps type and gap fillers type according to the confidence of each word forming the recognized sentence.

26. The method as claimed in claim 15, wherein the generation of the question includes, when one particular word generating a recognition error is a confirmation node on a dependency tree, including parent nodes existing up to a top of the dependency tree.

27. The method as claimed in claim 15, wherein the generation of the question includes, when one particular word generating the recognition error is a confirmation node on a dependency tree, when a parent node of the corresponding node has no error, and when the node is included in a noun clause, including parent nodes existing up to a top within the noun clause.

28. The method as claimed in claim 15, wherein the generation of the question includes, when a recognition error of continuous words is generated, including a portion ahead of the continuous words generating the recognition error.

29. An apparatus handling speech recognition errors, comprising:
   a speech signal input unit receiving a speech signal input from a user;
   a speech recognition unit extracting a speech feature from the speech signal input from the user and recognizing words, generating a plurality of candidate words and forming a recognized sentence;
   a recognition error determination unit determining whether there is an error in the recognized sentence according to a predetermined criterion based on sentence confidence and semantic structure of the recognized sentence; and
   a meta-dialogue generation unit generating a question questioning the user about the recognized sentence based on both a content of a portion where the error exists and a type of the error,
   wherein the question is adapted so that, after both a confidence $\theta_2$ determined that each word is a correct answer and another confidence $\theta_1$ determined that each word is an incorrect answer are obtained, the word is substituted by an interrogative when the confidence of each recognized word is less than $\theta_1$, the word is omitted without repetition when the confidence of each recognized word is greater than $\theta_2$, and a phrase of the recognized word is repeatedly questioned when the confidence of each recognized word is greater than or equal to $\theta_1$, and is less than or equal to $\theta_2$.

30. The apparatus as claimed in claim 29, wherein the question is adapted so that, when a recognition error is generated at a particular portion of the recognized sentence more than a predetermined number of times, candidate words of the recognized word are represented, and the user selects a correct candidate word.

31. The apparatus as claimed in claim 29, wherein the question employs any one of a non-reprise clarifications type, reprise sentences type, a reprise fragments type, gaps type and gap fillers type according to the confidence of each word forming the recognized sentence, when the recognition error is generated at a particular portion of the sentence less than a predetermined number of times.

32. A computer readable medium encoded with processing instructions performing a method of handling speech recognition errors in a spoken dialogue system, the method comprising:
   extracting a speech feature of a speech signal inputted by a user and finding a phoneme nearest to the speech feature to recognize a word and generating a recognized sentence;
   determining whether an error exists in the recognized sentence according to a predetermined criterion based on both a sentence confidence obtained from a confidence of the recognized word and a result of examining a semantic structure of the recognized sentence; and
   generating a question questioning the user about the recognized sentence based on both a content of a portion where the error exists and a type of the error,
   wherein the question is adapted so that, after both a confidence $\theta_2$ determined that each word is a correct answer and another confidence $\theta_1$ determined that each word is an incorrect answer are obtained, the word is substituted by an interrogative when the confidence of each recognized word is less than $\theta_1$, the word is omitted without repetition when the confidence of each recognized word is greater than $\theta_2$, and a phrase of the recognized word is repeatedly questioned when the confidence of each recognized word is greater than or equal to $\theta_1$, and is less than or equal to $\theta_2$.

33. The computer readable medium as claimed in claim 32, wherein the examining of the semantic structure of the recognized sentence includes:
   parsing the recognized sentence through a speech recognition unit and forming a dependency tree to which a thematic role is attached; and
   determining whether a meaning of each argument forming the dependency tree is valid.

* * * * *

UNITED STATES PATENT AND TRADEMARK OFFICE
CERTIFICATE OF CORRECTION

| | |
|---|---|
| PATENT NO. | : 7,493,257 B2 |
| APPLICATION NO. | : 10/911675 |
| DATED | : February 17, 2009 |
| INVENTOR(S) | : Jung-eun Kim et al. |

Page 1 of 1

It is certified that error appears in the above-identified patent and that said Letters Patent is hereby corrected as shown below:

Column 11, Line 56, change "errors," to --error,--.

Column 13, Line 31, change "errors," to --error,--.

Signed and Sealed this

Twelfth Day of May, 2009

JOHN DOLL
*Acting Director of the United States Patent and Trademark Office*